No. 686,704. Patented Nov. 19, 1901.
W. F. BOSSERT & F. T. FOXENBERGER.
BUSHING FOR INTERIOR CONDUITS.
(Application filed Aug. 30, 1901.)

(No Model.)

WITNESSES:
James E. Lynch
Joseph A. Gately

INVENTORS,
William F. Bossert
Fred T. Foxenberger
BY Geo. Willis Pierce
ATTORNEY.

UNITED STATES PATENT OFFICE.

WILLIAM F. BOSSERT AND FREDERICK T. FOXENBERGER, OF UTICA, NEW YORK, ASSIGNORS TO THE BOSSERT ELECTRIC CONSTRUCTION COMPANY, OF UTICA, NEW YORK.

BUSHING FOR INTERIOR CONDUITS.

SPECIFICATION forming part of Letters Patent No. 686,704, dated November 19, 1901.

Application filed August 30, 1901. Serial No. 73,817. (No model.)

*To all whom it may concern:*

Be it known that we, WILLIAM F. BOSSERT and FREDERICK T. FOXENBERGER, residing at Utica, in the county of Oneida and State of New York, have invented certain Improvements in Bushings for Interior Conduits, of which the following is a specification.

The present invention relates to means whereby the ends of interior conduit-pipes are firmly secured to the outlet-box at which they terminate, such means being known as "bushings" or "thimbles," and has especial reference to a form of bushing adapted to connect the flexible metallic-armored conduits, similar to those made under the patents issued to Edwin T. Greenfield, with such inlet-boxes with the same ease and certainty with which the inleading ends of the ordinary pipe-conduit are connected. The external appearance of such flexible metallic-armored conduits resembles a coarse flat screw having two spiral indentations on its outer and inner surfaces extending from one end to the other. Various attempts have been made to provide a proper terminal for these conduits in order to give the ends thereof a finished appearance and a support to prevent the fraying out or untwisting of the conduit end and which will at the same time be adapted for connecting the conduit with an outlet-box, so that the conductors drawn within the conduit may be brought out into the box for the various connections necessary.

The bushing forming the subject of the invention is made from a piece of sheet metal, which is drawn or struck up by means of dies in a manner well understood by a series of operations, after which the coarse thread is formed in the upper part of the bushing and the ordinary screw-thread is made upon the external surface of the lower part thereof and when attached to the end of a conduit is adapted to be locked or coupled to an outlet-box, or the ends of two conduits—a flexible and ordinary pipe conduit—may be coupled with one another.

Figure 1:
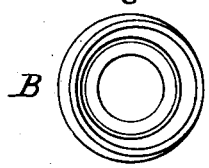
Figure 2:
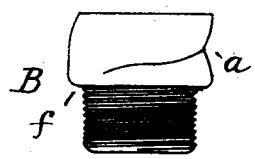
Figure 3:
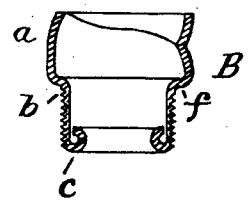
Figure 4:
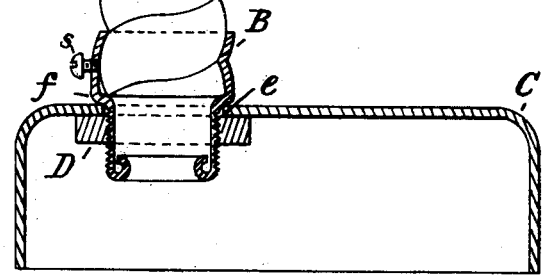
Figure 5:
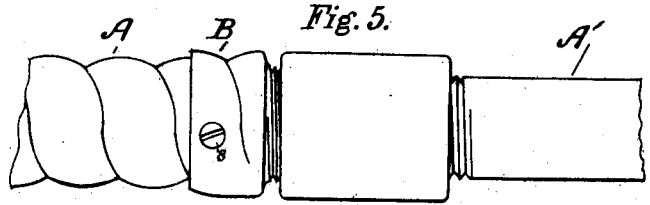

Referring to the accompanying drawings, Figures 1, 2, and 3 are respectively a top, side view, and a sectional view illustrative of the invention. Fig. 4 is a sectional view of an outlet-box, showing the attachment of the conduit to the bushing and of the latter to the outlet-box; and Fig. 5 illustrates the use of the bushing as a coupling.

A represents a conduit constructed after the manner referred to—*i. e.*, flexible and armored, made of long narrow strips of metal wound upon one another in such a fashion that its external appearance is that of a double coarse flat screw having two opposite spiral indentations throughout its length and the ends square with its axial lines.

C represents a section of an outlet-box having an orifice $e$ made in its bottom wall for the reception of the end of a conduit.

B is a bushing struck up from a piece of sheet metal into tubular form, having two diameters. The upper part $a$, having the largest diameter, is narrowed to the lower part $b$, forming a shoulder $f$ at its juncture and whose edge is turned inward and forms a roll $c$ to present a smooth curving surface from the outside of the part $b$ to the inner diameter of the same, the inner diameter of the roll being less than the inner diameter of the conduit to which it is attached. The walls of the upper portion $a$ on their outside and inside are formed into a coarse thread of the same pitch and configuration as the thread and outside surface of the conduit, constituting an internally-threaded or female nut adapted to be screwed over the end of the conduit, as shown in Fig. 4. A set-screw $s$ is provided to more securely fasten the bushing onto the end of the conduit A. The lower portion $b$ of the bushing has an ordinary screw-thread cut upon its outer surface, upon which a nut D is screwed after the bushing has been inserted into the opening $e$ of the outlet-box to hold and lock the conduit to the box.

By this invention conduit-pipes of the type referred to or any other similar conduit can be utilized at very much less expense and with greater ease and facility than it has been practicable before, as the conduit can be cut off to lengths required and the bushings A screwed to the ends, thus preventing them from spreading and unwinding and preparing them for the outlet-boxes, and flexible and ordinary pipe-conduits can be joined together by coupling the two ends, as shown in Fig. 5, thereby preserving the continuity of the smooth interior of both conduits. In Fig. 5 the bushed end B of the flexible conduit A is coupled to pipe-conduit A′ by the coupling E, which holds them tightly to each other.

We claim as our invention—

1. A terminal locking or coupling bushing for interior conduits of the type referred to herein, consisting of a tube or sleeve struck up from sheet metal whose upper part is of greater diameter than its lower part the juncture of the two parts forming a shoulder; the walls of the upper part being formed with a coarse flat internal screw-thread; the lower part having an ordinary screw-thread upon its outer surface, while its lower end rolls inward and forms a smooth curving surface, as set forth.

2. A terminal locking or coupling bushing for interior conduits of the type referred to herein, consisting of a tube or sleeve struck up from sheet metal whose upper part is of greater diameter than its lower part the juncture of the two parts forming a shoulder; the walls of the upper part being formed with a coarse flat internal screw-thread, and a set-screw adapted to enter a threaded screw-hole in the side of said part; the lower part having an ordinary screw-thread upon its outer surface, while its lower end rolls inward toward the inner surface of said part and forms a smooth curving surface, as set forth.

3. The combination of an interior conduit whose outer surface is formed into a coarse indented spiral or spirals resembling a screw-thread; with a terminal bushing consisting of a tube or sleeve struck up from sheet metal whose upper part is of greater diameter than its lower part the juncture of the two parts forming a shoulder the walls of the upper part being formed with a coarse flat internal screw-thread, the lower part having an ordinary screw-thread upon its outer surface; and a nut adapted to be threaded upon the said ordinary screw-thread; whereby one of said conduits may be locked or coupled to an outlet-box.

4. The combination of an interior conduit whose outer surface is formed into a coarse indented spiral or spirals resembling a screw-thread; with a terminal bushing consisting of a tube or sleeve struck up from sheet metal whose upper part is of greater diameter than its lower part the juncture of the two parts forming a shoulder; the walls of the upper part being formed with a coarse flat internal screw-thread; the lower part having an ordinary screw-thread upon its outer surface, as set forth.

5. The combination of an interior conduit whose outer surface is formed into a coarse indented spiral or spirals resembling a screw-thread; with a terminal bushing consisting of a tube or sleeve struck up from sheet metal whose upper part is of greater diameter than its lower part the juncture of the two parts forming a shoulder; the walls of the upper part being formed with a coarse internal screw-thread, whereby the said bushing is adapted to be screwed upon said conduit; the lower part having an ordinary screw-thread upon its outer surface, while its lower end rolls inward and forms a smooth curving surface, as set forth.

6. The combination of an interior conduit whose outer surface is formed into a coarse indented spiral or spirals resembling a screw-thread, and an interior conduit-pipe having a screw-thread upon its end; with a terminal bushing consisting of a tube or sleeve struck up from sheet metal whose upper part is of greater diameter than its lower part the jointure of the two parts forming a shoulder, the walls of the upper part being formed with a coarse flat internal screw-thread, the lower part having an ordinary screw-thread upon its outer surface; and a sleeve internally threaded, adapted to be screwed to the said lower part of the terminal bushing, and to the end of said interior conduit-pipe.

In testimony whereof we have signed our names to this specification, in the presence of two subscribing witnesses, this 28th day of August, 1901.

WILLIAM F. BOSSERT.
FRED. T. FOXENBERGER.

Witnesses:
 WILLIAM GRAY,
 LOUIS S. MILLER.